(12) United States Patent
Kanazawa

(10) Patent No.: US 6,194,713 B1
(45) Date of Patent: Feb. 27, 2001

(54) SCANNING OPTICAL DEVICE HAVING A ROTATABLE ADJUSTABLE HOLDER

(75) Inventor: Hiroshi Kanazawa, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/294,200

(22) Filed: Apr. 20, 1999

(30) Foreign Application Priority Data

Apr. 21, 1998 (JP) .................................................. 10-111182

(51) Int. Cl.⁷ .................................................. G02B 26/08
(52) U.S. Cl. .......................... 250/234; 359/198; 359/811; 358/474
(58) Field of Search ..................................... 250/234–236; 358/474, 493, 494; 359/198, 199, 210, 213, 811

(56) References Cited

U.S. PATENT DOCUMENTS

| 4,909,431 | * | 3/1990 | Japichino et al. | 228/103 |
| 4,912,567 | * | 3/1990 | Nakajima et al. | 358/451 |
| 5,637,852 | * | 6/1997 | Knowles et al. | 235/462.14 |
| 5,659,432 | * | 8/1997 | Takashima et al. | 359/811 |
| 5,742,326 | * | 4/1998 | Matsui et al. | 347/257 |
| 5,808,774 | * | 9/1998 | Kawabata | 359/210 |
| 6,008,924 | * | 12/1999 | Ikegame | 359/198 |

* cited by examiner

Primary Examiner—Stephone B. Allen
(74) Attorney, Agent, or Firm—Greenblum & Bernstein, P.L.C.

(57) ABSTRACT

A scanning optical device is provided with a light source, a polygon mirror, and a beam detector which detects the beam reaching a predetermined position in the main scanning direction. The beam detector has at least one elongated light receiving surface. The beam detector is supported by an adjustable holder. The adjustable holder is rotatable that the longitudinal direction of the light receiving surface can be varied with respect to the main scanning direction.

16 Claims, 8 Drawing Sheets

SCANNING OPTICAL DEVICE HAVING A ROTATABLE ADJUSTABLE HOLDER

BACKGROUND OF THE INVENTION

This invention relates to a scanning optical device used in an image forming apparatus such as a laser printer or the like.

Generally, a scanning optical device includes a light source which emits a beam and a rotatable polygon mirror which reflects the beam so that the beam scans across a surface of a photo-conductive drum. An fθ-lens is provided between the polygon mirror and the photo-conductive drum, which converges the beam on the surface of the photo-conductive drum. Hereinafter, the direction in which the beam moves according to the rotation of the polygon mirror is referred to as a main scanning direction. The direction perpendicular to the main scanning direction on a mirror surface of the polygon mirror is referred to as an auxiliary scanning direction.

A 'scanning range' is set within the actual moving range of the beam caused by the rotation of the polygon mirror. When the beam reaches one end (a starting position) of the scanning range, the scanning optical device starts modulation of the beam, so as to form latent image on the surface of the photo-conductive drum. The modulation of the beam is continued until the beam reaches the other end (an end position) of the scanning range.

In order to detect the beam reaching a proximate position to the starting position of the scanning range, an SOS (start-of-scan) sensor is provided in the scanning optical device. The SOS sensor is so constructed as to receive the beam via an intermediate mirror disposed in the proximity of the fθ-lens.

Since there is a possibility that the rotation axis of the polygon mirror is inclined due to a manufacturing error, the SOS sensor must have a length in the auxiliary n scanning direction. Thus, the SOS sensor uses a PIN photo diode array (as a beam detector)that has a plurality of elongated light receiving surfaces arranged in the main scanning direction. Each light receiving surface of the PIN photo diode array extends in the auxiliary scanning direction.

Further, in order to compensate the deviation of the rotation of the photo-conductive drum, a recently developed optical scanning device has a dynamic prism that is moved so that the beam shifts in the auxiliary scanning direction. It is preferred to dispose the dynamic prism between the light source and the fθ-lens, because the amount of the necessary movement of the dynamic lens can be decreased as the dynamic prism is close to the light source. In such a case, when the dynamic prism is moved, the beam directing toward the SOS sensor is also shifted of the beam in the auxiliary direction.

In such a scanning optical device, if the light receiving surface of the SOS sensor is inclined with respect to the main scanning direction, the following problem may arise. FIG. 1 shows the light receiving surface PD and a scanning line, that is, the movement of the beam passing through the light receiving surface PD. The scanning line before the dynamic prism is moved (that is, when the dynamic prism is positioned at its original position) is indicated by an arrow 'a'. The timing when the beam moves across the light receiving surface PD is indicated by Ta. When the dynamic prism is moved, the scanning line shifts in the auxiliary scanning direction as indicated by arrows 'b' and 'c'. If the scanning line shifts as indicated by the arrow 'b', the timing when the beam move across the light receiving surface PD is changes to time Tb that is ahead of time Ta. Conversely, if the scanning line shifts as indicated by the arrow 'c', the timing when the beam move across the light receiving surface PD is changes to time Tc that behind time Ta. Accordingly, the timing of the beam detection by the SOS sensor is influenced by the movement of the dynamic prism. Conseqently, the detected timing when the light modulating is to be started is influenced by the movement of the dynamic prism.

SUMMARY OF THE INVENTION

It is therefore an object of the present invention to provide an optical scanning device wherein timing of beam detection is not influenced by a shifting of a beam in an auxiliary scanning direction.

For the above purpose, according to an aspect of the present invention, there is provided a scanning optical device including a light source which emits a beam, a scanning unit which reflects the beam so that the beam scans in a main scanning direction, a beam detector which detects the beam reaching a predetermined position in the main scanning direction, and a adjustable holder which supports the beam detector. The beam detector has at least one elongated light receiving surface. The adjustable holder is rotatable so that an inclination of the light receiving surface can be varied with respect to the main scanning direction.

As constructed above, an operator is able to adjust the rotational position of the adjustable holder until the longitudinal direction of the light receiving surface is perpendicular to the main scanning direction (while observing the output from the beam detector). With such an adjustment, the timing of the beam detection by the beam detector is not influenced by the shifting of the beam an auxiliary scanning direction.

It is preferred that a rotation axis of the adjustable holder is aligned with a path of the beam directing toward the beam detector.

In a particular arrangement, the scanning optical device further includes a cylindrical support held by a stationary part of the scanning optical device. The adjustable holder has an engaging portion which engages a circumference of the cylindrical support so that the adjustable holder is rotatable about the cylindrical support. The beam proceeds through an interior of the cylindrical support toward the beam detector. An axis of the cylindrical support is aligned with a path of the beam directing toward the beam detector.

In a preferred embodiment, the beam detector further includes an inclination detecting sensor which detects an inclination of the longitudinal direction of the beam detector with respect to the main scanning direction, particularly, the inclination detecting sensor includes a pair of surfaces which are symmetrically disposed with respect to the rotation axis of the adjustable holder.

Advantageously, it is preferred to further provide a converging lens which converges the beam to the beam detector. The converging lens can be mounted in the cylindrical support.

Preferably, the adjustable holder has a positioning part in which the beam detector is positioned. It is preferable to provide a movement prevention arrangement which prevents the movement of the adjustable holder in an axis of the cylindrical support. It is further preferable to provide a rotation restriction member which restricts a range of rotation of the adjustable holder.

DESCRIPTION OF THE PREFERRED EMBODIMENT

The embodiment of the present invention is described below. An optical scanning device of this embodiment is mounted to an image forming apparatus such as a laser printer, a laser copier and a laser photo plotter, or laser facsimile or the like.

General Description

Figure 1:
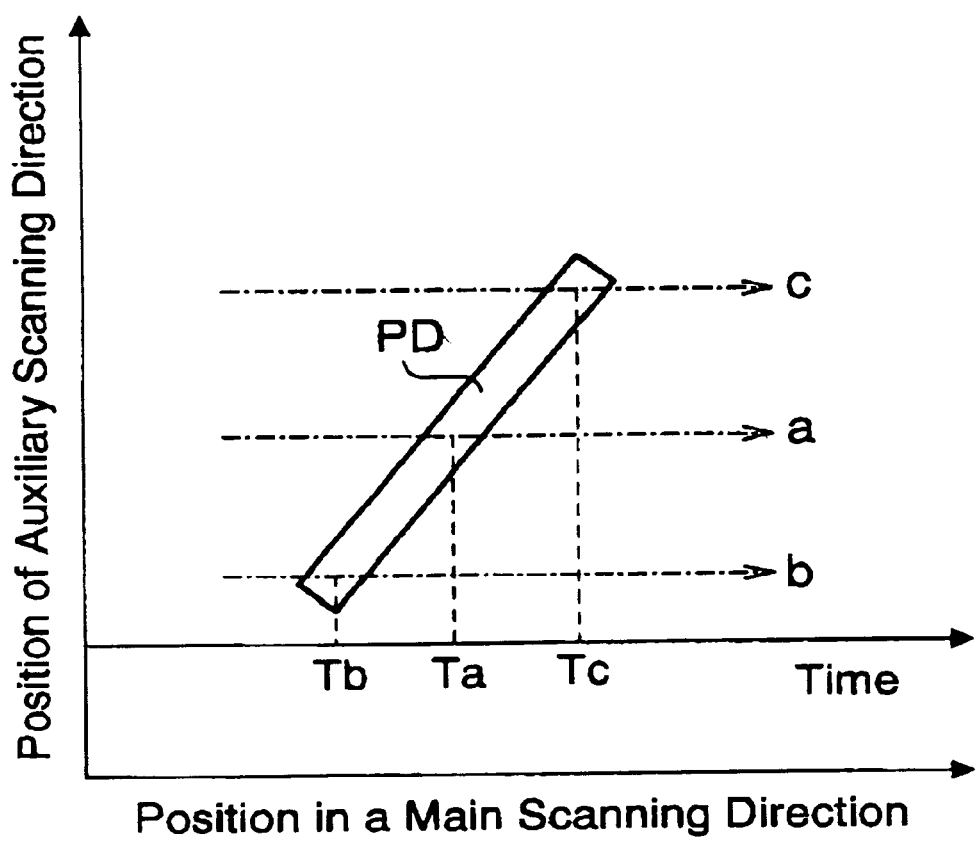
FIG. 1 is a schematic view illustrating a problem of a conventional optical scanning device.
Figure 2:
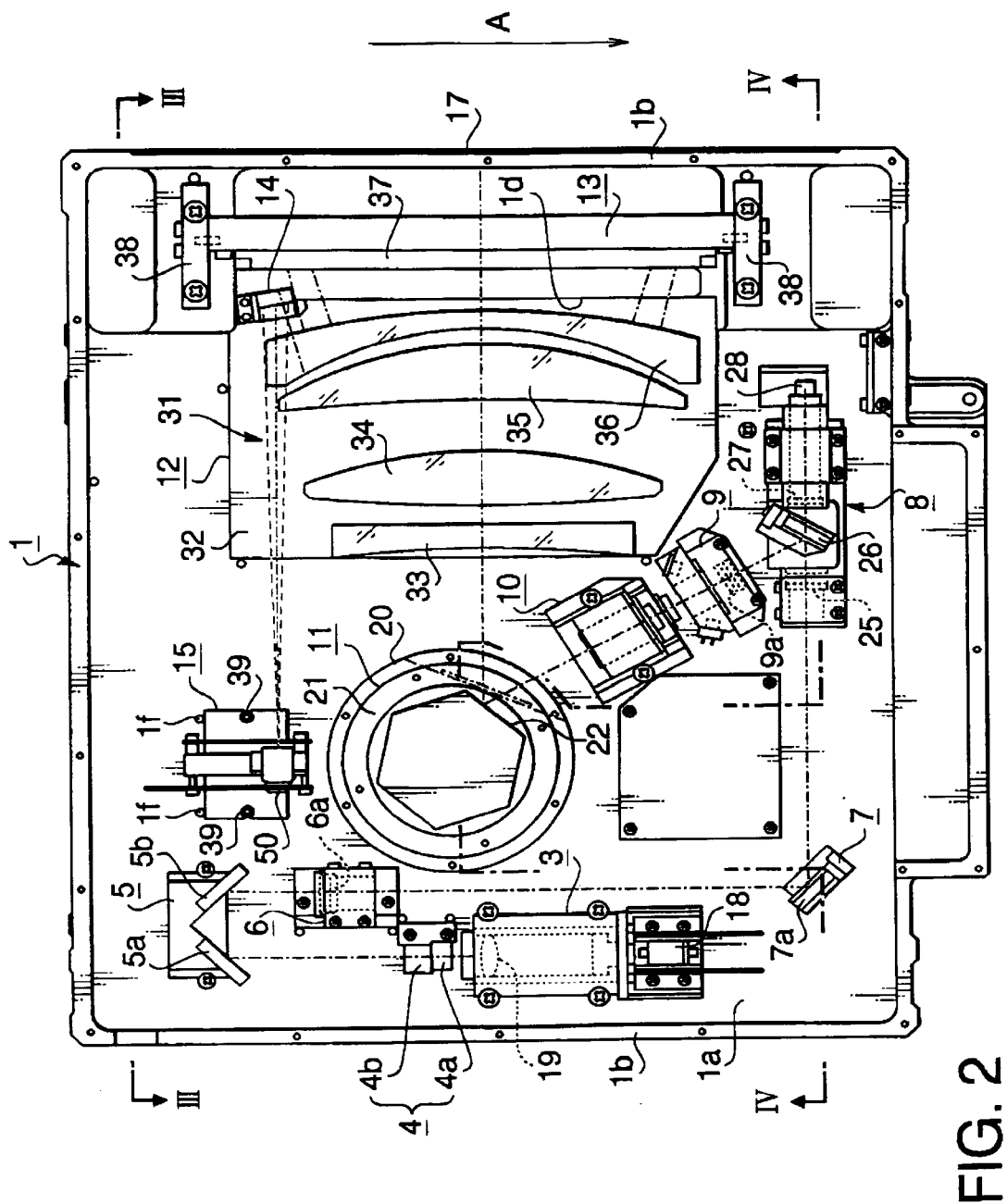
FIG. 2 is a plan view of a scanning optical device according to the embodiment.
Figure 3:
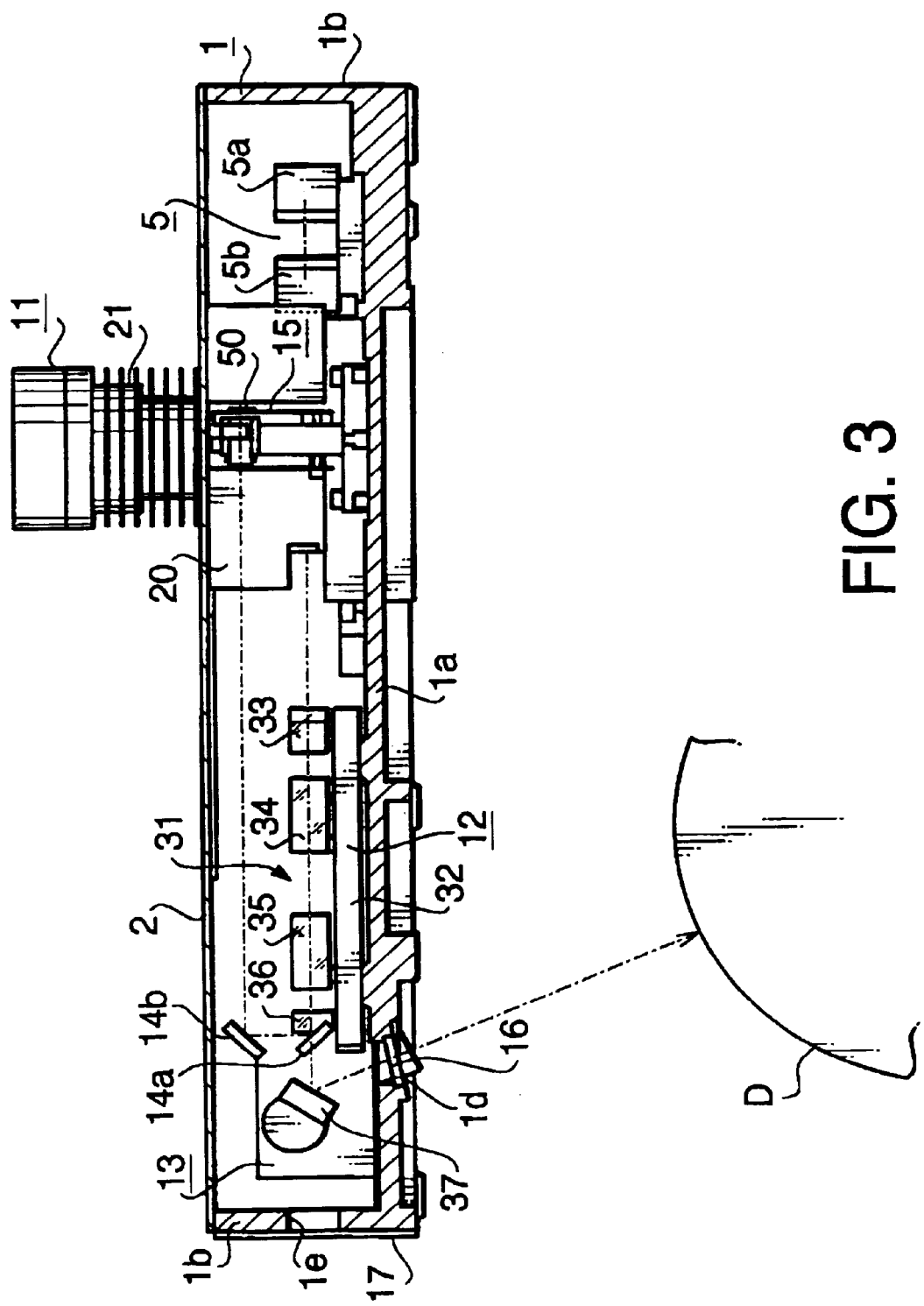
FIG. 3 is a sectional view of the scanning optical device of FIG. 2.
Figure 4:
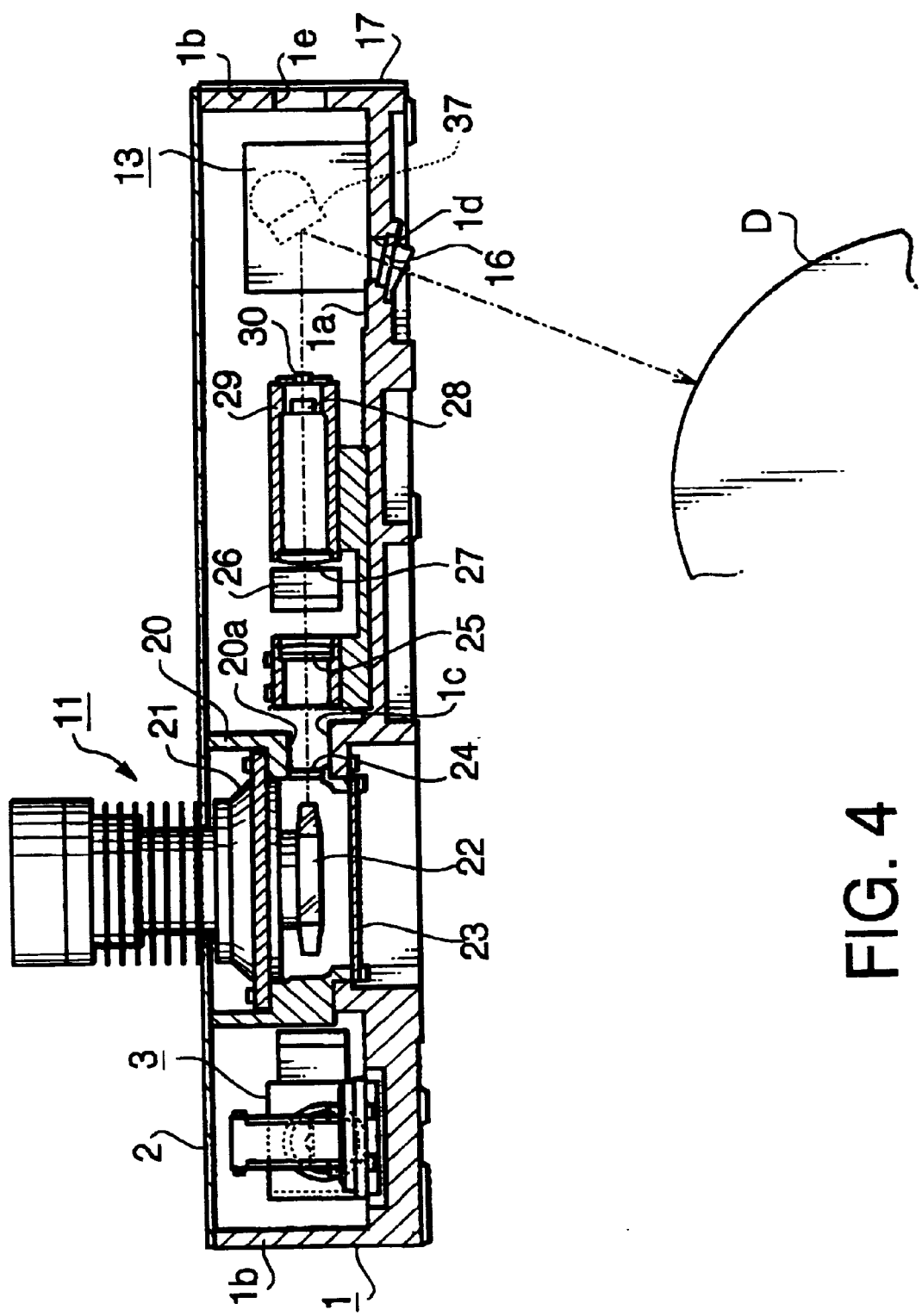
FIG. 4 is a sectional view of the scanning optical device of FIG. 2.

FIG. 2 is a sectional view of the optical scanning device showing an internal structure thereof. FIG. 3 is a sectional view of the optical scanning device taken along line III—III in FIG. 2. FIG. 4 is another sectional view of the optical scanning device taken along line IV—IV in FIG. 2.

As shown in FIG. 2, the optical scanning device has a case 1 of a flat rectangular shape. In FIG. 2, a top cover 2 (FIG. 3) provided on the top of the case 1 is removed. The case 1 is made of die casting aluminum alloy. Further, the case 1 includes a bottom plate 1a and a side plate 1b provide at four ends of the bottom plate 1a. Hereinafter, a longer end of the case 1 extending left to right (or, right to left) in FIG. 2 is defined as a longitudinal end. A shorter end of the case 1 extending vertically in FIG. 2 is defined as a shorter end. As shown in FIG. 3, the bottom plate 1a is flat, with a cylindrical projection 1c formed thereon for mounting a polygon mirror 22 (as detailed below). As shown in FIG. 2, a slot Id is formed on the bottom plate 1a, which extends along one shorter end of the case 1. Through the slot id, the laser beam is introduced outside the casing 1 to proceeds toward a photo-conductive drum provided beneath the scanning optical device. Further, an adjustment slot 1e is formed on the side plate 1b. The adjustment slot 1e is used when an operator adjusts the position of optical element (such as fθ-lens) mounted on the case 1, and closed by a cover 17 after the adjustment.

Optical elements mounted in the case 1 is detailed with reference to FIG. 2. A light source unit 3 is provided at one shorter end (that is, a left side in FIG. 2) of the case 1. The light source unit 3 includes a laser diode array package 18 and a collimator lens group 19 The laser diode array package 18 has a plurality of laser diodes, and is arranged to emit twelve laser beam. Each of the twelve laser beam is apart from the adjacent laser beam by approximately 100 micrometer. The collimator lens group 19 converts each divergent laser beam emitted from the laser diode array package 18 to a parallel laser beam. The twelve laser beam intersect with each other at an exit pupil of the collimator lens group 19. This collimator lens group 19 is designed to be substantially free from chromatic aberration. Further, the collimator lens group 19 is designed to have a high resolving power even for a large image height (since the twelve laser beams are incident on the collimator lens group 19). Further, the characteristics of the collimator lens group 19 do not tend to change according to the temperature.

The laser beam emitted from the light source unit 3 proceeds along the shorter end of the casing 1, and in parallel to the bottom plate 1a of the casing 1. The sectional shape of the laser beam is elongated (that is, ellipse), due to the characteristics of the laser diode array package 18. In order to correct the sectional shape of the laser beam, a prism unit 4 is provided in front of the laser light source unit 3, including two prisms 4a and 4b. The prism unit 4 reduces the longer diameter of each laser beam to approximately a half thereof, so that the sectional shape of the laser beam becomes a circle. The laser beam emitted from the prism unit 4 further proceeds along the shorter end of the case 1, and in parallel to the bottom plate 1a of the case 1.

A returning mirror unit 5 is positioned at a corner of the casing 1 (that is, a upper left corner of the casing 1 in FIG. 2). The returning mirror unit 5 includes first and second mirrors 5a and 5b both of which stand upright on the bottom plate 1a of the case 1. The first mirror 5a reflects the laser beam from the prism unit 4 by 90 degrees, while the second mirror 5b reflects the laser beam from the first mirror 5a by 90 degrees, so that the mirrors 5a and 5b consequently reflect the laser beam by 180 degrees. Along the path of the laser beam reflected by the returning mirror unit 5, a first relay lens 6 and a change direction mirror 7 are provided. The change-direction mirror 7 reflects the laser beam (from the returning mirror unit 5) by 90 degrees, so that the laser beam proceeds along the longitudinal end of the case 1.

A second relay lens 25 and a half mirror 26 are provided at positions proximate to the longitudinal end of the case 1. The laser beam reflected by the change-direction-mirror 7 proceeds the second relay lens 25 and enters the half mirror 26. The half mirror 26 partially allows the incident laser beam to pass, and partially reflects the incident laser beam toward the polygon mirror 22. The laser beam that has passed the half mirror 26 enters in a condenser lens 27 and a polarization beam splitter 28 located behind the half mirror 26. The laser beam is split by the polarization beam splitter 28 into two linear polarization components that are orthogonal to each other, and respectively received by light receiving elements 29 and 30 (FIG. 4). The light receiving elements 29 and 30 detect the light energy of the respective linear polarization components. The outputs of the light receiving elements 29 and 30 are used for a feedback control of the output of the laser diode array package 18.

The laser beam reflected by the half mirror 26 is directed to the polygon mirror 22. A dynamic prism unit 9 and a cylindrical lens 10 are provided between the half mirror 26 and the polygon mirror 22. The dynamic prism unit 9 includes a dynamic prism 9a, and is arranged to rotate the dynamic prism 9a about an axis parallel to the bottom plate 1a of the case 1, thereby to shift the laser beam in the auxiliary direction, for compensating the deviation of the rotation of the photo-conductive drum D (FIG. 3). The cylindrical lens group 10 has a positive power in the auxiliary direction. By virtue of this cylindrical lens group 10, the laser beam is converged as a linear image in the vicinity of a mirror surface of the polygon mirror 22.

The polygon mirror 22 is driven by a polygon mirror motor 21 (FIG. 3), and is rotated in a plane parallel to the bottom plate 1a of the case 1. The polygon mirror 22 reflects the laser beam and rotates clockwise in FIG. 2. As shown in FIG. 4, the polygon mirror 22 is isolated from the atmosphere by a cylindrical cover 20 mounted on the projection 1c formed on the bottom plate 1b of the case 1. The polygon mirror 22 and the polygon mirror motor 21 constitute a 'scanning unit'. The cylindrical cover 20 has an window 20a which allows the laser beam to be incident on the polygon mirror 22 and allows the reflected laser beam to proceed to the exterior of the cylindrical cover 20. A transparent cover glass 24 is provided in the window 20a. The bottom of the cylindrical cover 20 is covered by a lid 23. With this, the polygon mirror 22 is free from adhesions of dust or debris in the air. The polygon mirror motor 21 is provided on the upper part of the cylindrical cover 20. A drive shaft of the polygon mirror motor 21 extends downward (in a direction perpendicular to the bottom plate 1a of the case 1), to which the polygon mirror 22 is fixed.

Hereinafter, a "main scanning direction" is defined as a direction in which the laser beam scans according to the rotation of the polygon mirror 22. Further, an "auxiliary scanning direction" is defined as a direction perpendicular to the main scanning direction, on the mirror surface of the polygon mirror 22.

An fθ-lens group 31 is provided for converging the laser beam reflected by the polygon mirror 22 on the surface of the photo-conductive drum D. A reflection mirror 37 is provided to a shorter end of the case 1.

The fθ-lens group 31 includes first, second, third and fourth lenses 33, 34, 35 and 36 arranged in an order from the polygonal mirror 22 side. The lenses 33, 34, 35 and 36 are mounted on a board 32 fixed on the bottom plate 1a of the case 1. The laser beam that has passed the fθ-lens group 31 is reflected by the reflection mirror 37 provided to a shorter end (an opposing end with respect to the light source unit 3) of the case 1. The laser beam reflected by the reflection mirror 37 directs downward toward the photo-conductive drum D (FIG. 3).

The fθ-lens unit 31 has a relatively weak positive power in the main scanning direction, but has a relatively strong positive power in the auxiliary scanning direction so that the laser beam converges on a surface of the photo-conductive drum D (FIG. 3). That is, there is a conjugate relationship between the surface of the photo-conductive drum D and the mirror surface of the polygon mirror 22. It prevents the positional deviation of beam spots on the surface of the photo-conductive drum D caused by the inclination of the mirror surface of the polygon mirror 22.

In particular, the first lens 33 has a concave spherical surface on the polygon mirror 22 side and a cylindrical surface with a negative power on the reflection mirror 37 side. The first lens 33 has a relatively large negative power in the auxiliary scanning direction and a relatively small negative power in the main scanning direction. The second lens 34 is a meniscus-shaped toric lens having a convex-spherical surface on the polygon mirror 22 side and a convex toric surface on the reflection mirror 37 side. The second lens 34 has a relatively large positive power in the auxiliary scanning direction and a relatively small positive power in the main scanning direction. The third lens 35 is a positive meniscus lens having two spherical surfaces. The fourth lens 36 is a negative meniscus lens having two spherical surfaces.

The reflection mirror 37 extends along the shorter end of the case 1 and in parallel to the bottom plate 1a of the case 1. A slit 1d is formed on the bottom plate 1a of the case 1, which extends in parallel to the reflection mirror 37. The reflection mirror 37 is supported by a pair of mirror supports 38 in such a manner that the reflection mirror 37 is rotatably adjustable about an axis parallel to the slit Id. The angle of the reflection mirror 37 is so set that the laser beam transmitted through the fθ-lens group 31 is reflected by the reflection mirror 37 and proceeds through the slit Id toward the surface of the photo-conductive drum D (FIG. 3).

As constructed above, twelve laser beam emitted by the light source unit 3 respectively form twelve beam spots on a surface of the photo-conductive drum D (FIG. 3). According to the rotation of the polygon mirror 22, the twelve beam spots move in the main scanning direction on the surface of the photo-conductive drum D.

SOS Sensor Unit

The beam detection according to the embodiment is detailed. A 'scanning range' is set within the actual moving range of the beam on the fθ-lens group 31 caused by the rotation of the polygon mirror 22. When the laser beam reaches one end (that is, a starting position) of the scanning range, the modulation of the laser beam is started, thereby to form latent image on the surface of the photo-conductive drum D (FIG. 3). The modulation of the laser beam is stopped when the beam reaches the other end of the scanning range.

In order to detect the beam reaching a proximate position to the starting position of the scanning range, a detection mirror unit 14 is provided in the vicinity of the start position. The detection mirror unit 14 includes a pair of mirrors 14a and 14b which are vertically arranged and are inclined by 90 degrees with each other. The first mirror 14a reflects the laser beam from the polygon mirror 22 by 90 degrees, while the second mirror 14b reflects the laser beam from the first mirror 14a by 90 degrees, so that the mirrors 14a and 14b consequently reflect the laser beam by 180 degrees. An SOS (start-of-scan) sensor unit 15 is provided besides the polygon mirror 22. The SOS sensor unit 15 is constituted to receive the laser beam reflected by the detection mirror unit 14.

Figure 5:
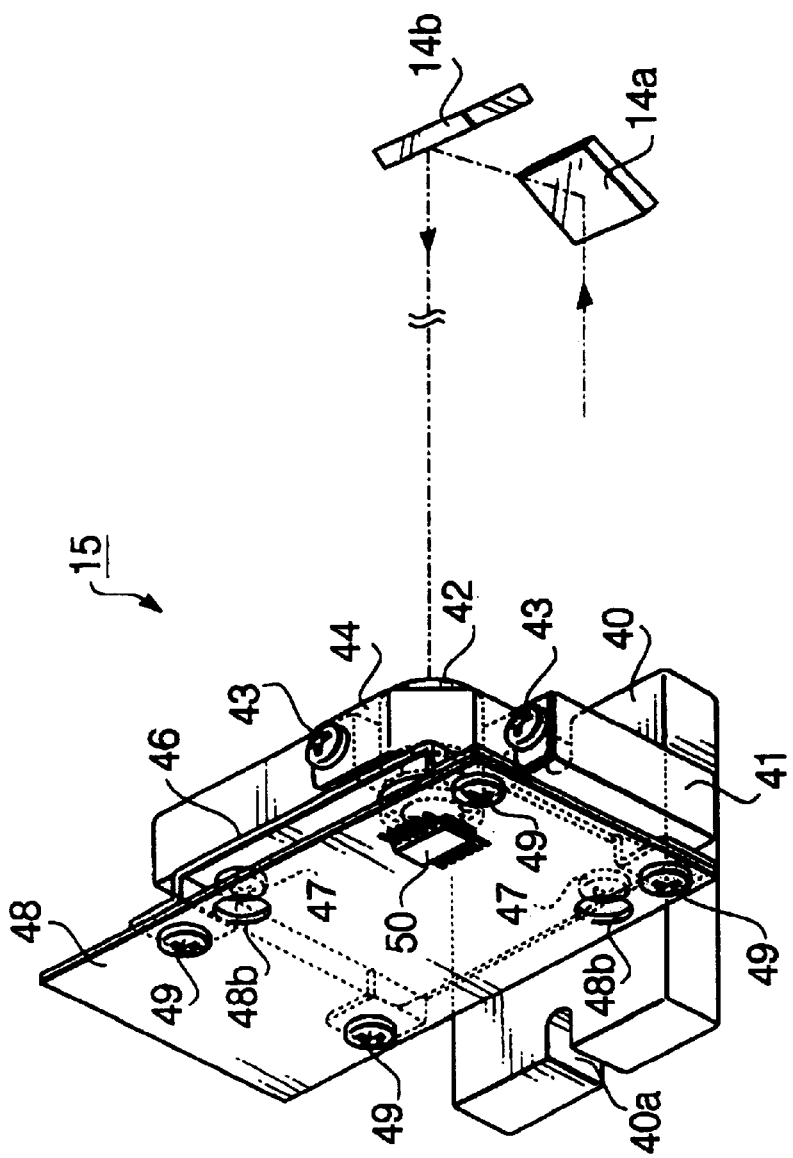
FIG. 5 is a perspective view of an SOS sensor unit according to the embodiment.
Figure 6:
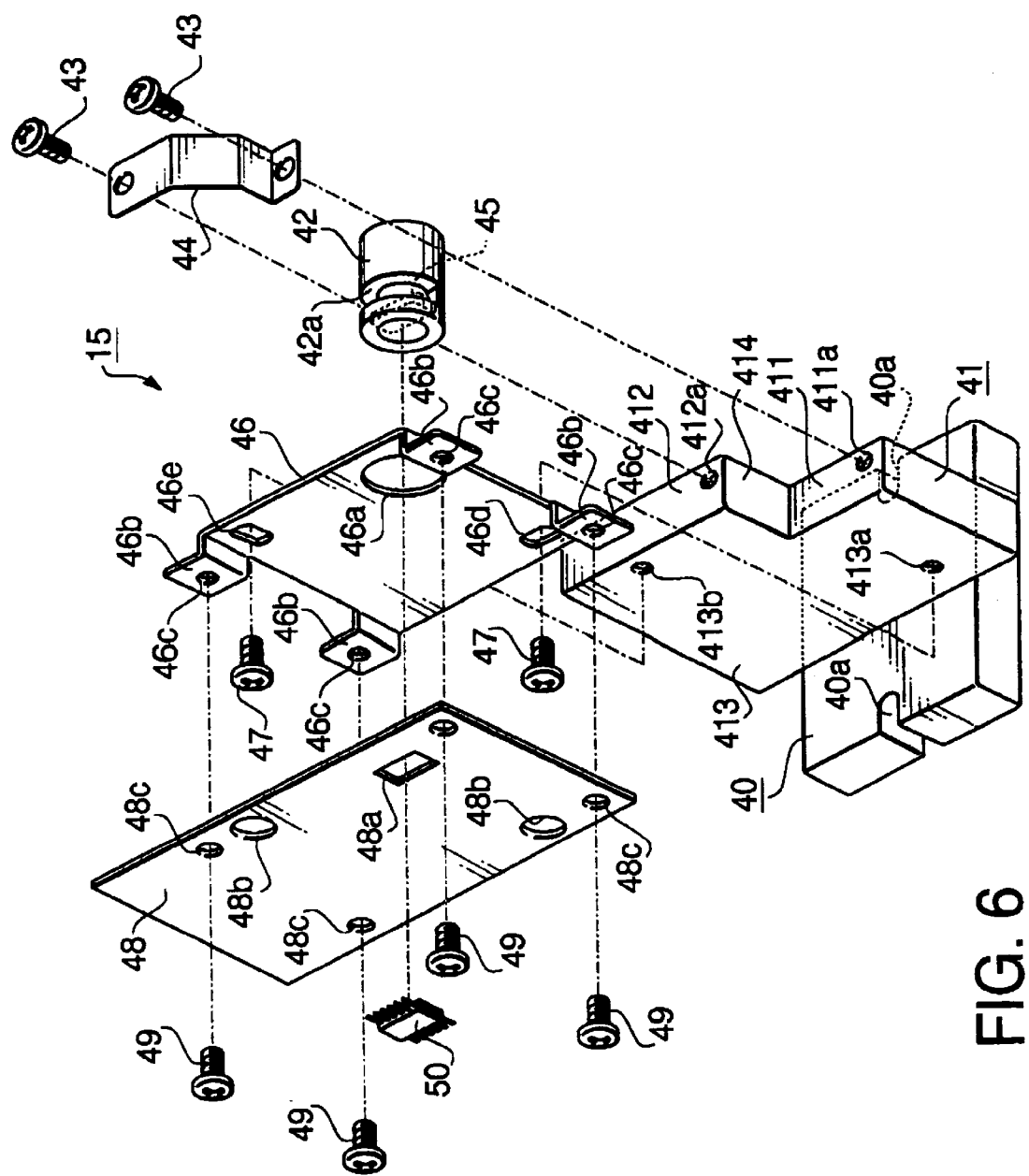
FIG. 6 is an exploded perspective view of the SOS sensor unit of FIG. 5.

The structure of the SOS sensor unit 15 is detailed. FIGS. 5 and 6 are a perspective view and an exploded perspective view of the SOS sensor unit 15. As shown in FIG. 6, the SOS sensor unit 15 includes a rectangular base plate 40. The base plate 40 has two notches 40a (one of which is hidden in FIG. 6) at both shorter ends. The base plate 40 is fixed on the bottom plate 1a of the case 1, by means of not-shown fixing screws penetrating the notches 40a. When the base plate 40 is mounted to the bottom plate 1a of the case 1, one longitudinal end of the base plate 40 abuts positioning pins 1f (FIG. 2). A mounting plate 41 stands upright on the base plate 40, with the bottom surface thereof being adhered to the base plate 40. The mounting plate 41 is substantially rectangular shaped, and an L-shaped shoulder 411 is formed at a corner thereof.

A cylindrical support 42 is provided to the L-shaped shoulder 411 of the mounting plate 41. The cylindrical support 42 is placed on the L-shaped shoulder of the mounting plate 41 with its outer surface contacting the L-shaped shoulder. The cylindrical support 42 has an outer diameter which is the same as the vertical length of the L-shaped shoulder 411. A band 44 is used to fix the cylindrical support 42 to the L-shaped shoulder 411. The band 44 is fixed to the mounting plate 41 by means of two fixing screws 43 engaging screw holes 412a and 411a respectively formed on the top of the mounting plate 41 and on the horizontal part of the L-shaped shoulder 411.

In a state the cylindrical support 42 is fixed to the mounting plate 41, the laser beam reflected by the detection mirror unit 14 travels through the interior of the cylindrical support 42 along the axis of the cylindrical support 42. The cylindrical support 42 has a notch 42a in which a cylinder lens 45 is fixed. The longitudinal direction of the cylinder lens 45 is perpendicular to the axis of the cylindrical support 42. The cylindrical lens 45 has a concave surface on the detection mirror unit 14 side and a flat surface on the other side. The rotational position of the cylindrical support 42 is adjusted so that the longitudinal direction of the cylindrical lens 45 is aligned with the main scanning direction of the laser beam reflected by the detection mirror unit 14. The cylindrical lens 45 (as well as the fθ-lens) constitute a converging optical system.

A plate-shaped adjustable holder 46 is mounted to the cylindrical support 42 so that the rectangular surface of the adjustable holder 46 is faced with the rectangular surface of the mounting plate 41. The adjustable holder 46 is located at a side opposing to the detection mirror unit 14 side, with respect to the mounting plate 42. The adjustable holder 46 is formed in the shape of a rectangular plate by means of press working, with four legs 46b being formed on four corners of the adjustable holder 46. Each legs 46b extends from the shorter end of the adjustable holder 46 in the direction perpendicular to the surface of the adjustable holder 46, and bends in the longitudinal direction of the adjustable holder 46. A screw hole 46c is formed on a tip of each leg 46b.

The adjustable holder 46 has a circular opening 46a into which the cylindrical support 42 fits. The circular opening 46a slidably engages the outer surface of the cylindrical support 42. The size of the adjustable holder 46 is smaller than the size of the mounting plate 41. That is, the support frame 46 is rotatable about an axis of the cylindrical support 42 by a certain degree without abutting the base plate 40.

In order to limit a rotation of the adjustable holder 46 about the cylindrical support 42, two elongated holes 46d and 46e are formed on the adjustable holder 46. Each of the elongated holes 46d and 46e are formed in the shaped of an arc which center is aligned with the axis of the circular opening 46a. Two fixing screws 47 are inserted through the elongated holes 46d and 46e and engaged in screw holes 413a and 413b formed on the mounting plate 41. By loosening the fixing screws 47, the adjustable holder 46 can be rotatably adjusted within a certain angle from an initial angle (where the longitudinal direction of the adjustable holder 46 is parallel to the main scanning direction). After the rotatable adjustment is completed, the adjustable holder 46 is fixed to the mounting plate 41 by tightening the fixing screws 47. The mounting plate 41, elongated holes 46d and 46e, screw holes 413a and 413b and fixing screws 47 constitute 'a rotation restriction arrangement' which restricts the rotation of the adjustable plate 46. At the same time, the mounting plate 41, elongated holes 46d and 46e, screw holes 413a and 413b and fixing screws 47 constitute 'a movement prevention arrangement' which prevents the adjustable plate 46 from moving along the axis of the cylindrical support 42.

The SOS sensor unit 15 includes a sensor board 48 that is overlapped onto the four legs 46b of the adjustable holder 46. The sensor board 48 has four through-holes 48c. By inserting fixing screws 49 through the through holes 48c and by engaging the fixing screws 49 into the screw holes 46c of the adjustable holder 46, the sensor board 48 is mounted to the adjustable holder 46. The sensor board 48 has two through-holes 48b at positions corresponding to the elongated holes 46d and 46e. The through-holes 48b are larger than the elongated holes 46d and 46e. With this, the operator is able to insert an operation tool through the holes 48b to rotate the fixing screws 49.

The sensor board 48 has a rectangular mounting opening 48a to which a SOS sensor (a beam detector) 50 is mounted. The longitudinal direction of the rectangular mounting hole 48a is aligned with the longitudinal direction of the sensor board 48. Further, when the SOS sensor 50 is mounted to the mounting hole 48a, the surface of the SOS sensor 50 is aligned with the surface of the sensor board 48.

Figure 7:
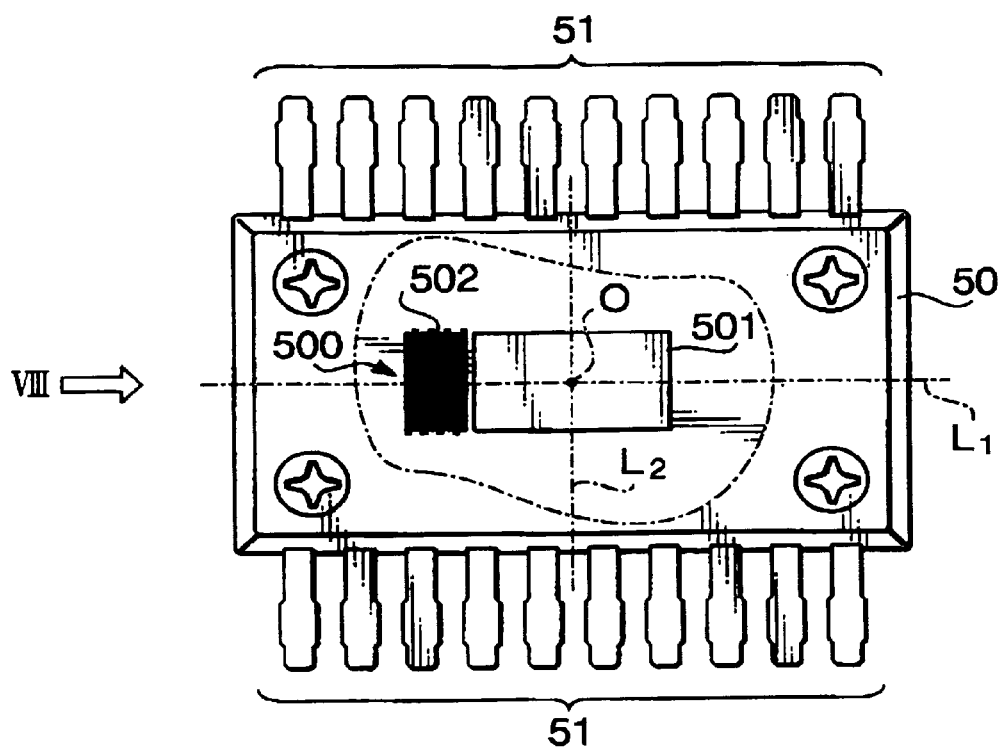
FIG. 7 is a plan view of a beam detector supported by the adjustable holder of FIG. 5.
Figure 8:
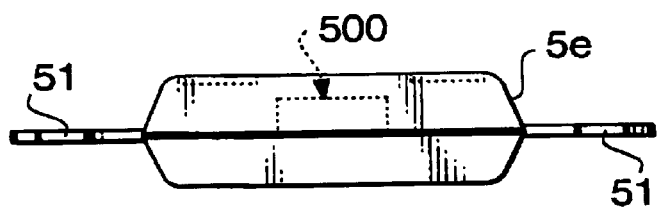
FIG. 8 is a side view of the beam detector of FIG. 7.

FIG. 7 is a plan view of the SOS sensor 50. FIG. 8 is a side view of the SOS sensor 50 seen from the direction VIII in FIG. 7. As shown in FIG. 7, the SOS sensor 50 has a rectangular shape. A horizontal center line extending in the longitudinal direction of the SOS sensor 50 is referred to as a horizontal center line L1. A center line extending in a direction perpendicular to the longitudinal direction of the SOS sensor 50 is referred to as a vertical center line L2. The intersection O of the horizontal and vertical center lines L1 and L2 is aligned with the axis of the rotation axis of the adjustable holder 46 (FIG. 6), when the SOS sensor 50 is mounted to the mounting hole 48a (FIG. 6) of the sensor board 48 fixed to the adjustable holder 46. Thus, when the adjustable holder 46 is rotated about the cylindrical support 42, the SOS sensor 50 is rotated about the center axis of the cylindrical support 42. Lead wires 51 of the SOS sensor 50 extend along longitudinal ends of the SOS sensor 50 and are connected to not-shown connectors provided on the sensor board 48.

As shown in FIG. 8, the SOS sensor 50 has a PIN photo diode array 500 sealed in a sealing compound 5e (that is made of a material which allows the laser beam to transmit).

Figure 9:
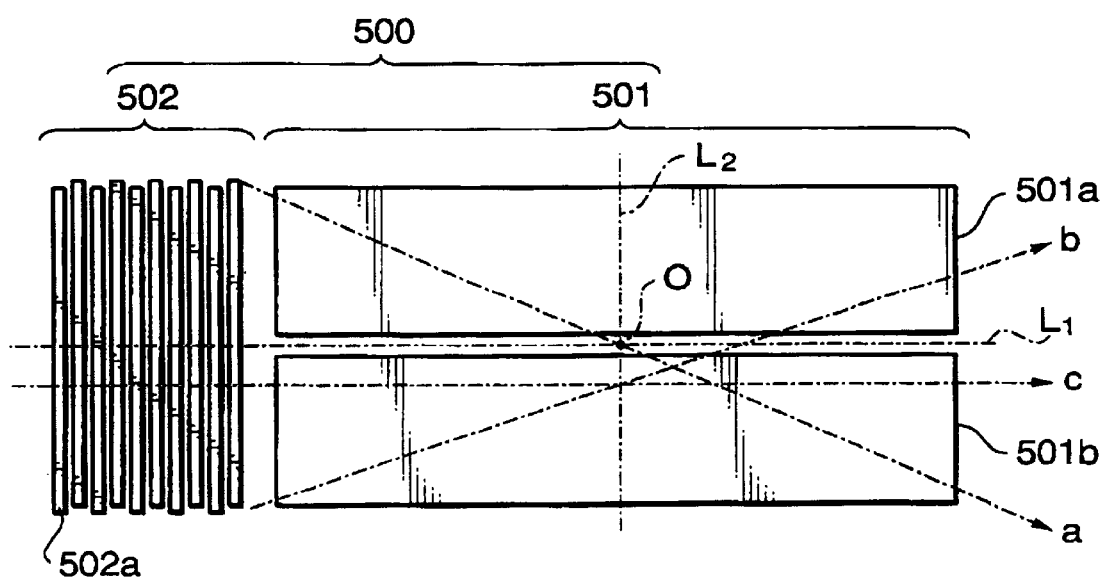
FIG. 9 is an enlarged view of light receiving surfaces of the beam detector of FIG. 7.

FIG. 9 is an enlarged view of the PIN photo diode array. The PIN photo diode array 500 includes an inclination detection part 501 and a start position detection part 502, arranged on the horizontal center line L1. The inclination detection sensor part 501 is used to detect the inclination of the SOS sensor 50 with respect to the main scanning direction. The inclination detection part 501 includes an upper and lower light receiving surfaces 501a and 501b provided on both sides of the horizontal center line L1, which are symmetrical with each other with respect to the horizontal center line L1. Output (photo-current) from the upper and lower inclination part 501a and 501b are sent to a not-shown control circuit provided to the exterior of the SOS sensor 50.

The start position detection part 502 is used to detect that the scanned beam reaches the start position in the main scanning direction. The start position detection part 502 includes ten elongated light receiving surfaces 502a arranged along the horizontal center line L1. Outputs (photo-current) from the light receiving surfaces 502a are sent to the control circuit.

Assembly and Adjustment Operation

The assembly and adjustment operation of the SOS sensor unit 15 are described with reference to FIG. 2.

The operator first fixes the mounting plate 41 to the base plate 40 by means of adhesive agent or the like, and mounts the cylindrical lens 45 to the cylindrical support 42. Further, the operator puts the cylindrical support 42 onto the L-shaped shoulder 411 of the mounting plate 41, and fixes the cylindrical support 42 to the L-shaped shoulder 411 by means of the band 44.

Next, the operator mounts the adjustable holder 46 to the cylindrical support 42 so that the cylindrical support 42 fits in the circular opening 46a of the adjustable holder 46. Further, the operator engages the fixing screws 47 lightly in the screw holes 413a and 413b through the elongated holes 46d and 46e, so as to temporally fix the adjustable holder 46 to the mounting plate 41. In this state, the adjustable holder 46 can be rotated when the operator forces the adjustable holder 46 in the rotational direction.

Then, the operator mounts the SOS sensor 50 into the mounting hole 48a of the sensor board 48, and connects the lead wires of the SOS sensor 50 to the not-shown connectors provided on the sensor board 48. Further, the operator fixes the sensor board 48 to the adjustable holder 46 (by means of the fixing screws 49). With such an operation, the SOS sensor unit 15 is assembled. In this state, the center of the SOS sensor 50 is aligned with the center axis of the cylindrical support 42 (that is, the rotation axis of the adjustable holder 46).

Next, the operator fixes the SOS sensor unit 15 on the bottom plate 1a of the case 1 on which the other optical elements have already been mounted. The operator operates the scanning optical device to start emitting the laser beam from the laser diode array package 18. The emitted laser beam is converted (by the collimator lens group 19) to parallel beams, and proceeds to the prism unit 4 where the sectional shape of the laser beam is corrected. Further, the laser beam is reflected by the returning mirror unit 5 by 180 degrees, and travels through the first relay lens 6, the change-direction mirror 7 and the second relay lens 25, to enter the half mirror 26. The laser beam incident on the half mirror 26 is partially lead to the light receiving elements 29 and 30.

The laser beam reflected by the half mirror 26 proceeds to the polygon mirror 22, traveling through the dynamic prism unit 9 and the cylindrical lens 10. By the clockwise rotation of the polygon mirror 22, the laser beam scans in a direction denoted as A in FIG. 2. Just before the scanning laser beam reaches the start position, the scanning laser beam enters the detection mirror 14, reflected by the detection mirror 14 by 180 degrees, and proceeds to the SOS sensor unit 15. As shown in FIG. 5, in the SOS sensor unit 15, the laser beam travels through the interior of the cylindrical support 42 and enters the cylindrical lens 45 on the SOS sensor 50. With this, the laser beam is converged on the PIN photo diode array 500 (FIG. 7) of the SOS sensor 50 and forms beam spots thereon. The beam spots move on the surface of the PIN photo diode array in the main scanning direction.

The following description is made with reference to FIG. 9. Although twelve beam spots are formed on the PIN photo diode array 500, FIG. 9 shows the movement of one beam spot (and its variation). The operator measures the ratio of the output of the upper receiving surface 501a with respect to the output of the lower receiving surface 501b of the SOS sensor unit 15 by means of not-shown device. If the horizontal center line L1 of the PIN photo diode array 500 positions in the main scanning direction and is not inclined with respect to the main scanning direction, the beam spot may move along the horizontal center line L1. In such a case, the ratio of the output of the upper receiving surface 501a with respect to the output of the lower receiving surface 501b is 1, and is not changed according to the movement of the beam spot. The operator recognizes that the PIN photo diode array 500 is correctly positioned and directed.

If the PIN photo diode array is inclined with respect to the main scanning direction, the beam spot moves across the upper and lower receiving surfaces 501a and 501b of the inclination detection part 501 of the PIN photo diode array 500, passing through the center O of the PIN photo diode array 500, as shown by an arrow 'a'. In such a case, the above described ratio changes according to the movement of the beam spot, for example, from 10 to 1, and further to 0.1. If the operator finds the decrease or increase in the ratio, the operator recognizes that the SOS sensor 50 is inclined with respect to the main scanning direction. Thus, the operator minutely rotates the adjustable holder 46 (as well as the SOS sensor 50) with respect to the cylindrical support 42 and repeats the above described measurement. The operator repeats such adjustment and measurement until the above described ratio is 1 and is not changed by the movement of the beam spot in the main scanning direction.

If the PIN photo diode array is inclined with respect to the main scanning direction, and if there is some error in the other optical elements, the beam spot moves across the upper and lower receiving surfaces 501a and 501b, without passing through the center O of the PIN photo diode array 500 as shown by an arrow 'b'. In such a case, the ratio changes according to the movement of the beam spot, for example, from 0.1 to 0.8, and further to 2. Then, the operator rotates the adjustable holder 46 (as well as the SOS sensor 50) with respect to the cylindrical support 42 and repeats the measurement. The operator repeats such adjustment and measurement until the ratio is constant and is not changed by the movement of the beam spot. Then, the resulting movement of the beam spot is as shown in an arrow 'C'.

With such an adjustment of the adjustable holder 46, the longitudinal direction of the light receiving surfaces 502a of the PIN photo diode array 500 is perpendicular to the main scanning direction. Thus, the timing when the SOS sensor 50 detects the laser beam is not influenced by the shifting of the laser beam (caused by the movement of the dynamic prism 9). After the adjustment is completed, the operator securely fix the adjustable holder 46 to the mounting plate 41 (FIG. 6) by tightly engaging the fixing screws 47.

As constructed above, according to the embodiment, since the longitudinal direction of the light receiving surfaces 502a of the PIN photo diode array 500 is perpendicular to the main scanning direction, the timing when the SOS sensor 50 detects the laser beam is not influenced by the shifting of the laser beam.

Although the optical scanning device is described herein with respect to the preferred embodiments, many modifications and changes can be made without departing from the spirit and scope of the invention.

The present disclosure relates to subject matter contained in Japanese Patent Application No. HEI 10-111182, filed on Apr. 21, 1998, which is expressly incorporated herein by reference in its entirety.

What is claimed is:

1. A scanning optical device comprising:
   a light source which emits beam;
   a scanning unit which reflects the beam in a main scanning direction;
   a beam detector which detects the beam reaching a predetermined position in said main scanning direction, said beam detector having at least one elongated light receiving surface; and
   an adjustable holder which supports said beam detector, wherein said adjustable holder is rotatable so that a longitudinal direction of said light receiving surface can be varied with respect to said main scanning direction.

2. The scanning optical device according to claim 1, wherein a rotation axis of said adjustable holder is aligned with a path of the beam directing toward said beam detector.

3. The scanning optical device according to claim 1, said adjustable holder having a positioning part in which said beam detector is positioned.

4. The scanning optical device according to claim 1, further comprising an intermediate mirror disposed at a position proximate to an end of a scanning range of the beam, wherein said intermediate mirror reflects the beam to said beam detector.

5. The scanning optical device according to claim 1, further comprising a dynamic prism which is moved in a direction perpendicular to said main scanning direction.

6. The scanning optical device according to claim 1, wherein said beam detector further comprises an inclination detection sensor which detects an inclination of a longitudinal direction of said light receiving surface with respect to said main scanning direction of the beam incident on said beam detector.

7. The scanning optical device according to claim 6, wherein said inclination detection sensor includes a pair of surfaces which are symmetrically disposed with respect to a rotation axis of said adjustable holder.

8. The scanning optical device according to claim 1, further comprising a cylindrical support held by a stationary part of said scanning optical device;

said adjustable holder having an engaging portion which engages a circumference of said cylindrical support so that said adjustable holder is rotatable about said cylindrical support, wherein the beam proceeds through an interior of said cylindrical support toward said beam detector.

9. The scanning optical device according to claim 8, wherein an axis of said cylindrical support is aligned with a path of the beam directing toward said beam detector.

10. The scanning optical device according to claim 8, further comprising a movement prevention arrangement which prevents said adjustable holder from moving in a direction along an axis of said cylindrical support.

11. The scanning optical device according to claim 8, further comprising a rotation restriction arrangement which restricts a range of rotation of said adjustable holder.

12. The scanning optical device according to claim 8, said adjustable holder comprising a board.

13. The scanning optical device according to claim 8, further comprising a converging lens which converges the beam to said beam detector.

14. The scanning optical device according to claim 13, wherein said converging lens is mounted in said cylindrical support.

15. The scanning optical device according to claim 8, wherein said cylindrical support is held on a L-shaped shoulder of said stationary part.

16. The scanning optical device according to claim 15, wherein said cylindrical support is fixed to said L-shaped shoulder by means of a band member.

* * * * *